United States Patent [19]

Püntener et al.

[11] Patent Number: 4,507,124
[45] Date of Patent: Mar. 26, 1985

[54] 1:2 METAL COMPLEXES OF AZOMETHINE DYES HAVING ARYLAZO GROUPS

[75] Inventors: Alois Püntener, Rheinfelden; Fabio Beffa, Riehen, both of Switzerland

[73] Assignee: Ciba-Geigy Corporation, Ardsley, N.Y.

[21] Appl. No.: 505,647

[22] Filed: Jun. 20, 1983

[30] Foreign Application Priority Data

Jul. 2, 1982 [CH] Switzerland ............... 4053/82

[51] Int. Cl.$^3$ ............................................. C09B 45/24
[52] U.S. Cl. ..................................... 534/695; 8/681; 8/685; 8/687; 8/917; 8/924; 8/437
[58] Field of Search ............... 260/145 C, 145 A, 169; 8/437, 685

[56] References Cited

U.S. PATENT DOCUMENTS

| | | | |
|---|---|---|---|
| 4,033,942 | 7/1977 | Beffa et al. | 260/145 A |
| 4,116,952 | 9/1978 | Beffa et al. | 260/145 B |
| 4,331,596 | 5/1982 | Beffa et al. | 260/145 A |
| 4,424,153 | 1/1984 | Baumann et al. | 260/149 |
| 4,436,659 | 3/1984 | Buhler et al. | 260/146 R |

FOREIGN PATENT DOCUMENTS

| | | |
|---|---|---|
| 66230 | 12/1982 | European Pat. Off. |
| 82117 | 6/1983 | European Pat. Off. |
| 2123453 | 11/1972 | Fed. Rep. of Germany |
| 7206267 | 11/1972 | Netherlands |

OTHER PUBLICATIONS

Chemical Abstract, vol. 78, 59772s, (1973).

Primary Examiner—A. Lionel Clingman
Attorney, Agent, or Firm—Edward McC. Roberts

[57] ABSTRACT

The dyes of the formula I

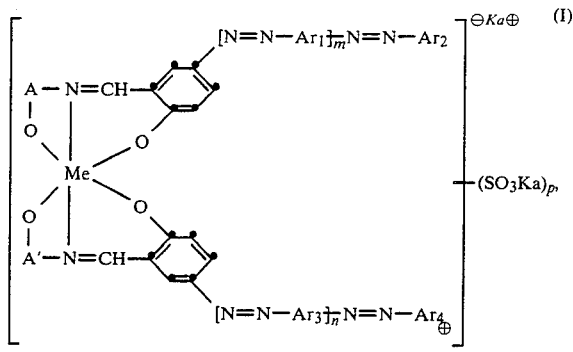

in which Me is cobalt or chromium, A and A' independently of each other are each the radical of an amine of the benzene series which carries the hydroxyl group in the o-position relative to the azomethine group, $Ar_1$ and $Ar_3$ independently of each other are each a substituted or unsubstituted phenylene or naphthylene radical, $Ar_2$ and $Ar_4$ independently of each other are each a substituted or unsubstituted benzene or naphthalene radical, m and n independently of each other are each 0 or 1, p is an integer from 3 to 6 and $Ka^{\oplus}$ is a cation, are suitable for dyeing polyamides, particularly wool and leather.

6 Claims, No Drawings

1:2 METAL COMPLEXES OF AZOMETHINE DYES HAVING ARYLAZO GROUPS

The present invention relates to metal complex dyes of the formula I

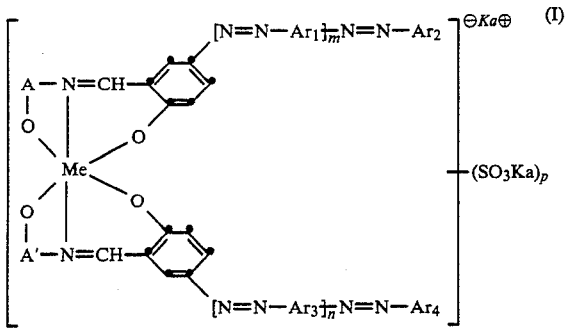

in which Me is cobalt or chromium, A and A' independently of each other are each the radical of an amine of the benzene series which carries the hydroxyl group in o-position relative to the azomethine group, $Ar_1$ and $Ar_3$ independently of each other are each a substituted or unsubstituted phenylene or naphthylene radical, $Ar_2$ and $Ar_4$ independently of each other are each a substituted or unsubstituted benzene or naphthalene radical, m and n independently of each other are each 0 or 1, p is an integer from 3 to 6 and $Ka^\oplus$ is a cation.

In the novel metal complex dyes of the above formula I, the radicals A and A' can carry a further one or more substituents, for example low molecular weight alkyl or alkoxy, halogen, for example chlorine or bromine, nitro, cyano, sulfo, alkylsulfonyl, for example methylsulfonyl, sulfamides, for example sulfamide or sulfamethylamide, or acylamino. Low molecular weight alkyl or alkoxy groups are in this Application generally to be understood those having 1 to 6, preferably 1 to 2, C atoms, and "acylamino" refers to low molecular weight alkanoylamino, alkylsulfonylamino and alkoxycarbonylamino radicals and to sulfonylamino, aroylamino and arylsulfonylamino radicals as well. The radicals A and A' derive from, for example, the following amines: 2-amino-1-hydroxybenze, 4-chloro- and 4,6-dichloro-2-amino-1-hydroxybenzene, 4- or 5-nitro-2-amino-1-hydroxybenzene, 4-chloro-, 4-methyl- and 4-acetylamino-6-nitro-2-amino-1-hydroxybenzene, 6-acetylamino- and 6-chloro-4-nitro-2-amino-1-hydroxybenze, 4-cyano-2-amino-1-hydroxybenzene, 4-sulfonamido-2-amino-1-hydroxybenzene, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 4-chloro-2-amino-1-hydroxybenzene-6-sulfonic acid, 4-sulfonylamido-2-amino-1-hydroxybenzene or 4-methylsulfonyl-2-amino-1hydroxybenzene.

$Ar_1$ and $Ar_3$ are substituted or unsubstituted phenylene or napthylene radicals, possible substituents being in the main the sulfo groups and—in the case of the phenylene radical—low molecular weight alkyl and alkoxy radicals, for example methyl, ethyl or methoxy.

$Ar_2$ and $Ar_4$ are benzene or naphthalene radicals, and they can carry the substituents customary for diazo components.

$Ka^\oplus$ is preferably lithium, potassium or especially sodium. $Ka^\oplus$ can also be an ammonium cation or the ammonium salt of an organic amine.

Preferred dyes of the invention have the formula II

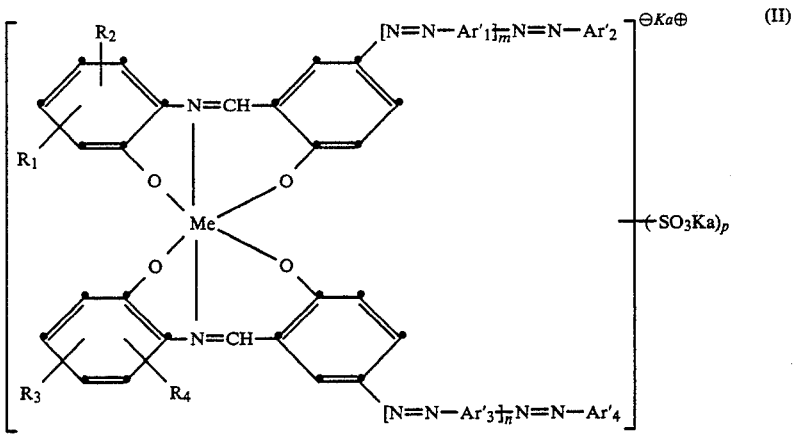

in which Me is cobalt or chromium, $R_1$, $R_2$, $R_3$ and $R_4$ independently of one another are each hydrogen, nitro, chlorine, sulfo, $C_1$–$C_4$-alkyl, $C_1$–$C_4$-alkoxy, sulfamide, N-mono- or N,N-dialkylated sulfamide, or alkylsulfonyl, $Ar_1'$ and $Ar_3'$ independently of each other are each a phenylene radical which is unsubstituted or substituted by sulfo, $C_1$–$C_4$-alkyl or $C_1$–$C_4$-alkoxy, or a naphthylene radical which is unsubstituted or substituted by sulfo, $Ar_2'$ and $Ar_4'$ independently of each other are each a phenyl radical which is unsubstituted or substituted by chlorine, bromine, nitro, sulfo, sulfamide, N-mono- or N,N-dialkylated sulfamide, alkylsulfonyl, alkyl, alkoxy or acrylamino, or a naphthyl radical which is unsubstituted or substituted by a sulfo, m and n are each 0 or 1, p is an integer from 3 to 6, and $Ka^\oplus$ is a cation.

The preferred dyes are those in which n and m are each 0 and those in which p is 4, 5 or 6.

Because they are easily accessible and have good dyeing properties, the most preferred complexes are the symmetrical complexes of the formula III

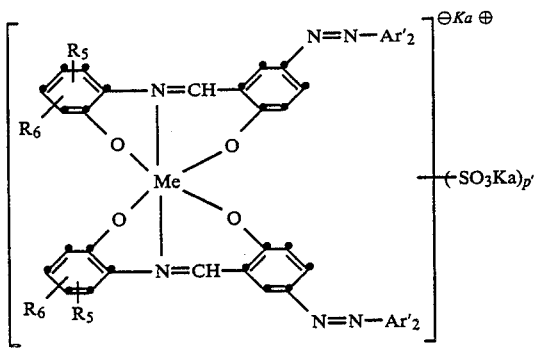

in which Me is cobalt or chromium, $R_5$ and $R_6$ are each hydrogen chlorine, nitro or sulfo, $Ar_2'$ is a phenyl radical which is unsubstituted or substituted by chlorine, sulfo, nitro, alkyl, alkoxy or acylamino, or a naphthyl radical which is unsubstituted or substituted by sulfo, p' is 4 or 6, and $Ka^{\oplus}$ is a cation.

Me is preferably cobalt.

$R_5$ is preferably nitro or sulfo which are arranged in the 4- or 6-position of the 1-hydroxy-2-aminobenzene.

The dyes of the invention can be prepared by methods known per se, for example by reacting a dye of the formula

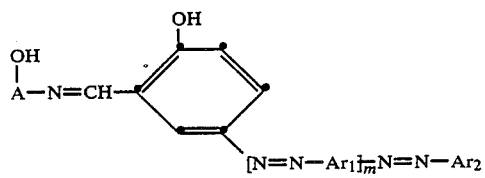

and the dye of the formula V

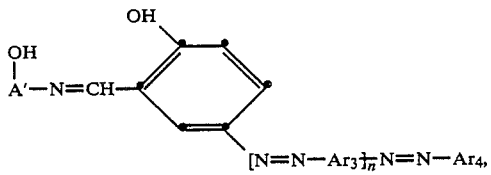

which dyes IV and V can be identical, with a cobalt- or chromium-donating agent to give the 1:2 metal complex.

Dyes of the formula IV or V are known and can be prepared by conventional methods. It is advantageous to use as starting materials not the dyes of the formula IV or V, but the individual components, i.e. amines of the formula

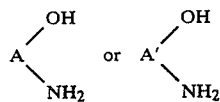

and the appropriate substituted o-hydroxybenzaldehydes.

If, in the above process, the dyes IV and V differ from each other, the products are mixtures of 1:2 metal complexes which, in addition to symmetrical complexes which contain 2 molecules of dye of the formula IV or V, also contain asymmetrical complexes which contain one molecule of dye of the formula IV and one molecule of dye of the formula V.

The 1:2 chromium complexes can also be prepared by preparing the 1:1 chromium complex of a dye of the formula IV or of a dye of the formula V and then reacting this 1:1 chromium complex with a non-metallised dye of the formula V or IV respectively to give the 1:2 chromium complex. In this way it is possible to prepare purely asymmetrical 1:2 chromium complexes.

The cobalting and the chroming are carried out by conventional methods.

The novel metal complex dyes which can be obtained by the above methods are advantageously isolated in the form of their salts, in particular alkali metal salts, such as lithium, potassium but especially sodium salts, or ammonium salts. They are suitable for dyeing a great variety of natural or synthetic nitrogen- and hydroxyl-containing materials, such as polyamides or polyurethanes, but in particular for dyeing wool or, especially, leather.

The novel dyes are tinctorially strong, dye up well and give good cover. They have good affinity and good buildup, and produce dyeings having good fastness properties, such as fastness to washing, water, perspiration, rubbing, diffusion and light. Their good acid and alkali stability and acid and alkali fastness are particularly noteworthy. Leather is dyed in strong yellowish brown to brown shades.

In the following examples, parts and percentages are by weight, unless otherwise stated. The temperatures are given in degree Centigrade.

EXAMPLE 1

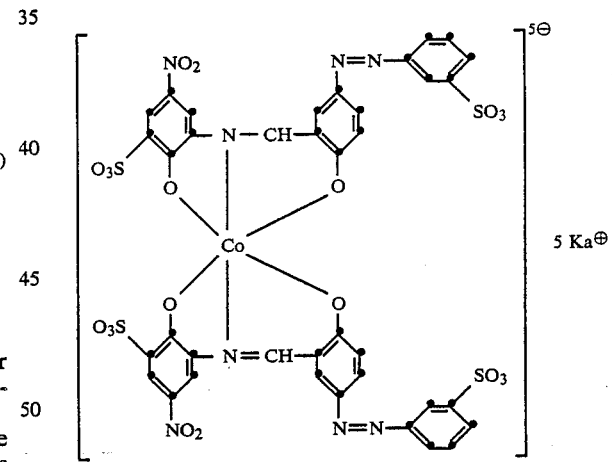

23.4 parts of 2-amino-4-nitro-1-hydroxybenzene-6-sulfonic acid and 30.6 parts of 5-(3'-sulfophenylazo)-2-hydroxybenzaldehyde are introduced into 600 parts of water, and the temperature is raised to 80°. At this temperature, 55 parts by volume of a 1-molar cobalt sulfate solution are added dropwise and a constant pH of 8 is maintained by means of 2-molar sodium hydroxide solution. About 5 hours later the metallisation is virtually complete. The dye salted out with 70 parts of sodium chloride and 105 parts of potassium chloride, filtered off when the mixture is cooled down, and dried, has the anion complex of the above formula. $Ka^{\oplus}$ is sodium or potassium or a mixture of both. The dye dyes leather in a yellowish brown shade having good fastness properties.

EXAMPLE 2

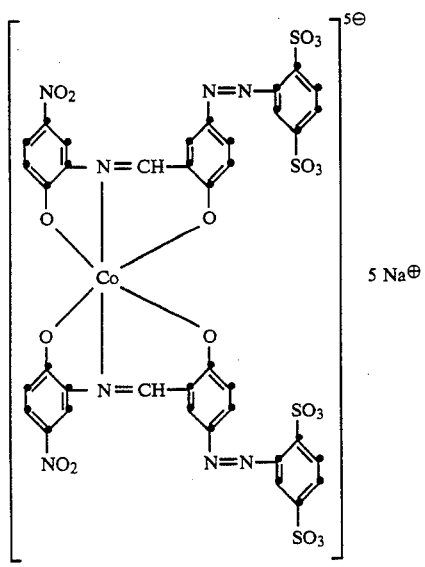

15.4 parts of 4-nitro-2-amino-1-hydroxybenzene and 38.6 parts of 5-(2',5'-disulfophenylazo)-2-hydroxybenzaldehyde are introduced into 500 parts of water, and the temperature is raised to 80°. 200 parts by volume of such a solution of 15.5 parts of cobalt sulfate heptahydrate and 16.5 parts of tartaric acid as has been treated with 3.4 parts of 35% hydrogen peroxide and has been adjusted to pH 8 by means of 5N sodium hydroxide solution are added dropwise with efficient stirring. The mixture is stirred for several hours at 80°-85° and constant pH 8, held by adding 5N sodium hydroxide solution, until complex formation is complete. The cobalt complex dye formed is salted out by adding sodium chloride, filtered off and washed with saturated sodium chloride solution. When dried, it is a brown powder which is soluble in water and dyes leather in yellowish brown shades of good fastness properties.

The following table contains further dyes which can be prepared by the process described above. Column 2 gives the amines used, column 3 the aldehydes used and column 4 the metal used to form the complex. Column 5 indicates the shades which the novel dyes produce on leather.

TABLE

| No. | Amine | Aldehyde | Metal | Shade on leather |
|---|---|---|---|---|
| 1. | 4-nitro-2-amino-1-hydroxybenzene-5-sulfonic acid | 5-(2'-sulfo-4'-acetylaminophenylazo)-2-hydroxybenzaldehyde | Co | yellowish brown |
| 2. | 4-nitro-2-amino-1-hydroxybenzene-5-sulfonic acid | 5-(2'-sulfo-4'-propionylaminophenylazo)-2-hydroxybenzaldehyde | Co | yellowish brown |
| 3. | 4-nitro-2-amino-1-hydroxybenzene-5-sulfonic acid | 5-(3'-sulfo-4'-acetylaminophenylazo)-2-hydroxybenzaldehyde | Co | yellowish brown |

TABLE-continued

| No. | Amine | Aldehyde | Metal | Shade on leather |
|-----|-------|----------|-------|------------------|
| 4. | 2-amino-6-nitro-4-sulfophenol | 5-(2-hydroxy-3-formyl-phenylazo)-2-sulfo-4-(propionylamino)benzene | Co | yellowish brown |
| 5. | 2-amino-6-nitro-4-sulfophenol | 4-(2-hydroxy-3-formyl-phenylazo)-3-sulfobenzene | Co | yellowish brown |
| 6. | 2-amino-4-nitro-6-sulfophenol | 5-(2-hydroxy-3-formyl-phenylazo)-2-sulfo-4-(acetylamino)benzene | Co | yellowish brown |
| 7. | 2-amino-4-nitro-6-sulfophenol | 4-[4-(2-hydroxy-3-formyl-phenylazo)phenylazo]-4'-sulfoazobenzene | Co | orange-tinged brown |
| 8. | 2-amino-4-nitrophenol | bis-azo disulfo aldehyde compound | Co | orange-tinged brown |

TABLE-continued

| No. | Amine | Aldehyde | Metal | Shade on leather |
|---|---|---|---|---|
| 9. | 2-hydroxy-3-amino-5-nitrobenzenesulfonic acid (HO$_3$S, OH, NH$_2$, NO$_2$ substituents) | 2-hydroxy-1-naphthaldehyde coupled via azo to naphthalene-SO$_3$H and then azo to benzenesulfonic acid | Co | orange-tinged brown |
| 10. | 2-amino-4-sulfophenol (OH, NH$_2$, SO$_3$H) | 2-hydroxy-5-[(4-sulfophenyl)azo-phenylazo]benzaldehyde | Co | orange-tinged brown |
| 11. | 2-amino-6-nitro-4-sulfophenol (OH, O$_2$N, NH$_2$, SO$_3$H) | 2-hydroxy-5-[(2-sulfo-4-chlorophenyl)azo]benzaldehyde | Co | yellowish brown |
| 12. | 2-amino-6-nitro-4-sulfophenol (OH, O$_2$N, NH$_2$, SO$_3$H) | 2-hydroxy-5-[(2-sulfo-4-methylphenyl)azo]benzaldehyde | Co | yellowish brown |

TABLE-continued

| No. | Amine | Aldehyde | Metal | Shade on leather |
|---|---|---|---|---|
| 13. | 2-amino-4-nitro-6-hydroxybenzenesulfonic acid (OH, O₂N, NH₂, SO₃H) | 5-(2-sulfo-4-nitrophenylazo)salicylaldehyde | Cr | yellowish brown |
| 14. | 2-amino-4-nitro-6-hydroxybenzenesulfonic acid | 5-(2-sulfo-4-nitrophenylazo)salicylaldehyde | Co | reddish yellow-brown |
| 15. | 2-amino-4-nitro-6-sulfophenol | 5-(2-sulfo-4-nitrophenylazo)salicylaldehyde | Co | reddish yellow-brown |
| 16. | 2-amino-4-nitro-6-sulfophenol | 5-(2-sulfo-4-nitrophenylazo)salicylaldehyde | Cr | yellowish-brown |
| 17. | 2-amino-4-sulfophenol | 5-(2,5-disulfophenylazo)salicylaldehyde | Co | yellowish brown |

TABLE-continued

| No. | Amine | Aldehyde | Metal | Shade on leather |
|---|---|---|---|---|
| 18. | 2-amino-3-hydroxy-5-nitrobenzenesulfonic acid (OH, HO₃S, NH₂, NO₂) | salicylaldehyde coupled with diazotized 2-methoxy-5-aminobenzenesulfonic acid (OH, CHO, N=N, SO₃H, OCH₃) | Co | yellowish brown |
| 19. | 2-amino-5-nitrophenol (OH, NH₂, NO₂) | salicylaldehyde coupled with diazotized aniline-2,5-disulfonic acid (OH, CHO, N=N, SO₃H, SO₃H) | Co | reddish yellow-brown |
| 20. | 2-amino-4-chloro-phenol-6-sulfonic acid (OH, HO₃S, NH₂, Cl) | salicylaldehyde coupled with diazotized 4-nitroaniline-2-sulfonic acid (OH, CHO, N=N, SO₃H, NO₂) | Co | reddish yellow-brown |
| 21. | 2-amino-4-nitrophenol-6-sulfonic acid (OH, HO₃S, NH₂, NO₂) | salicylaldehyde coupled with diazotized 4-acetylamino-aniline-2-sulfonic acid (OH, CHO, N=N, SO₃H, NHCOOCH₃) | Co | yellowish brown |
| 22. | 2-amino-4-nitrophenol (OH, NH₂, NO₂) | salicylaldehyde coupled with diazotized aniline-2,5-disulfonic acid (OH, CHO, N=N, SO₃H, SO₃H) | Co | yellowish brown |

TABLE-continued

| No. | Amine | Aldehyde | Metal | Shade on leather |
|---|---|---|---|---|
| 23. | 2-amino-4-nitro-5-hydroxybenzenesulfonic acid (OH, O₂N, NH₂, SO₃H) | 5-[(4'-(4''-sulfophenylazo)phenyl)azo]salicylaldehyde | Co | ornage-tinged brown |
| 24. | 2-amino-4-nitro-6-sulfophenol | 5-(2'-sulfophenylazo)salicylaldehyde | Co | yellowish brown |
| 25. | 2-amino-4-nitro-6-sulfophenol | 5-(4'-sulfophenylazo)salicylaldehyde | Co | yellowish brown |
| 26. | 2-amino-4-nitro-6-sulfophenol | 5-(2'-chloro-4'-sulfophenylazo)salicylaldehyde | Co | yellowish brown |
| 27. | 2-amino-4-nitrophenol | 5-(1',5'-disulfonaphth-2'-ylazo)salicylaldehyde | Co | yellowish brown |

| No. | Amine | Aldehyde | Metal | Shade on leather |
|---|---|---|---|---|
| 28. | (2-amino-4-nitrophenol) | (salicylaldehyde coupled with naphthalene-1,5-disulfonic acid via azo, with SO₃H and SO₂H) | Co | yellowish brown |
| 29. | (2-amino-4-nitrophenol) | (salicylaldehyde coupled with naphthalene-1,3,5-trisulfonic acid via azo) | Co | yellowish brown |
| 30. | (2-amino-5-sulfo-6-hydroxy benzene derivative) | (salicylaldehyde coupled with phenyl via azo) | Co | yellowish brown |

A method of dyeing leather 100 parts of clothing suede leather are wetted out at 50° in a solution of 1,000 parts of water and 2 parts of 24% ammonia in the course of 2 hours, and are then dyed at 60° for 1 hour in a solution of 1,000 parts of water, 2 parts of 24% ammonia and 3 parts of the dye of Example 1. A solution of 40 parts of water and 4 parts of 85% formic acid is then added, and dyeing is continued for a further 30 minutes. The leather pieces are then thoroughly rinsed and treated, if desired, at 50° for 30 minutes with 2 parts of a dicyanodiamino-formaldehyde condensation product, to give a yellowish brown dyeing having good fastness properties.

What is claimed is:

1. A metal complex dye of the formula I

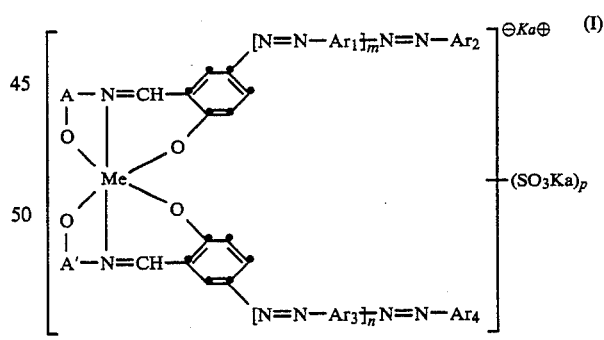

in which Me is cobalt or chromium, A and A' independently of each other are each the radical of an amine of the benzene series which carries the hydroxyl group in o-position relative to the azomethine group, $Ar_1$ and $Ar_3$ independently of each other are each a substituted or unsubstituted phenylene or naphthylene radical, $Ar_2$ and $Ar_4$ independently of each other are each a substituted or unsubstituted benzene or naphthalene radical, m and n independently of each other are each 0 or 1, p is an integer from 4 to 6 and $Ka^\oplus$ is a cation.

2. A metal complex dye according to claim 1, of the formula

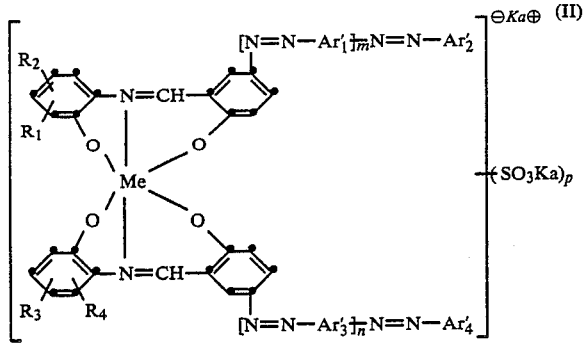

in which Me is cobalt or chromium, $R_1$, $R_2$, $R_3$ and $R_4$ independently of one another are each hydrogen, nitro, chlorine, sulfo, $C_1$-$C_4$-alkyl, $C_1$-$C_4$-alkoxy, sulfamide, N-mono- or N,N-dialkylated sulfamide, or alkylsulfonyl, $Ar_1$ and $Ar_3$ independently of each other are each a phenylene radical which is unsubstituted or substituted by sulfo, $C_1$-$C_4$-alkyl or $C_1$-$C_4$-alkoxy, or a naphthylene radical which is unsubstituted or substituted by sulfo, $Ar_2$ and $Ar_4$ independently of each other are each a phenyl radical which is unsubstituted or substituted by chlorine, bromine, nitro, sulfo, sulfamide, N-mono- or N,N-dialkylated sulfamide, alkylsulfonyl, alkyl, alkoxy or acylamino, or a naphthyl radical which is unsubstituted or substituted by sulfo, m and n are each 0 or 1, p is an integer from 3 to 6, and $Ka^{\oplus}$ is a cation.

3. A metal complex dye according to claim 1, in which m and n are each 0.

4. A symmetrical metal complex dye according to claim 1 of the formula III

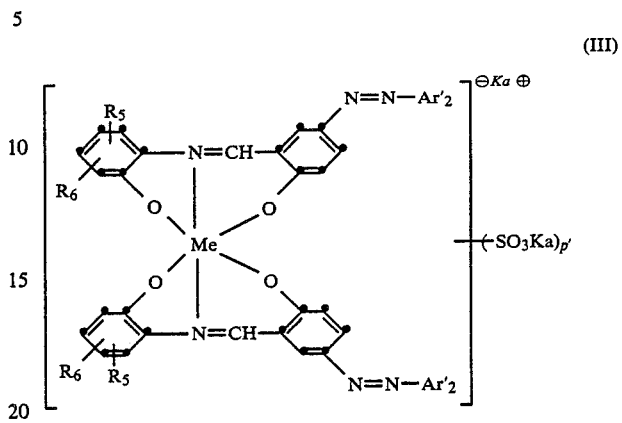

in which Me is cobalt or chromium, $R_5$ and $R_6$ are each hydrogen, chlorine, nitro or sulfo, $Ar'_2$ is a phenyl radical which is unsubstituted or substituted by chlorine, sulfo, nitro, alkyl, alkoxy or acylamino, or a naphthyl radical which is unsubstituted or substituted by sulfo, p' is 4 or 6, and $Ka^{\oplus}$ is a cation.

5. A symmetrical metal complex dye according to claim 4, in which $R_5$ is nitro or sulfo which are arranged in the 4- or 6-position of 1-hydroxy-2-aminobenzene.

6. A metal complex dye according to claim 1, in which Me is cobalt.

* * * * *